US010508732B2

(12) United States Patent
Nakanishi

(10) Patent No.: US 10,508,732 B2
(45) Date of Patent: Dec. 17, 2019

(54) SHIFT DEVICE

(71) Applicant: KABUSHIKI KAISHA TOKAI-RIKA-DENKI-SEISAKUSHO, Aichi-ken (JP)

(72) Inventor: Kenji Nakanishi, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 0 days.

(21) Appl. No.: 15/015,782

(22) Filed: Feb. 4, 2016

(65) Prior Publication Data
US 2016/0230878 A1 Aug. 11, 2016

(30) Foreign Application Priority Data

Feb. 10, 2015 (JP) .................. 2015-024746

(51) Int. Cl.
F16H 59/10 (2006.01)
F16H 59/02 (2006.01)
(Continued)

(52) U.S. Cl.
CPC ....... F16H 59/105 (2013.01); F16H 59/0278 (2013.01); F16H 59/10 (2013.01);
(Continued)

(58) Field of Classification Search
CPC ....... F16H 2057/0056; F16H 2059/026; F16H 2059/0256; F16H 2059/0295;
(Continued)

(56) References Cited

U.S. PATENT DOCUMENTS 6,447,415 B1* 9/2002 Hashimoto ............... F16H 7/08
474/109
8,322,245 B2* 12/2012 Kino ...................... F16H 59/10
74/473.12
(Continued)

FOREIGN PATENT DOCUMENTS

EP 1 363 047 A2 11/2003
EP 2 636 926 A1 9/2013
(Continued)

OTHER PUBLICATIONS

JP 06280973 A (Tokuhiro Ida) Oct. 7, 1994. Position Signal Generating Device (9410). [Retrieved on Aug. 8, 2018]. Retrieved from https://dialog.proquest.com/professional/docview/1382251962?accountid=161361 (Year: 1994).*
(Continued)

Primary Examiner — Victor L Macarthur
Assistant Examiner — Joseph Brown
(74) Attorney, Agent, or Firm — Roberts Mlotkowski Safran Cole & Calderon P.C.

(57) ABSTRACT

In a shift lever device, a first facing cavity and a second facing cavity of a lever, and a first facing hole and a second facing hole of a printed wiring board, respectively face each other when the lever is disposed in an "H" position. Thus, in a state in which the lever is disposed in the "H" position when the shift lever device is being assembled, the first facing cavity and the second facing cavity respectively face the first facing hole and the second facing hole, thereby enabling the accuracy of relative assembly positions of a magnet of the lever and detection elements of the printed wiring board to be increased, and enabling the detection accuracy of a shift position of the lever to be improved.

4 Claims, 10 Drawing Sheets

(51) Int. Cl.
*F16H 57/00* (2012.01)
*F16H 61/24* (2006.01)
*G05G 9/047* (2006.01)

(52) U.S. Cl.
CPC ............ *F16H 2057/0056* (2013.01); *F16H 2059/026* (2013.01); *F16H 2059/0295* (2013.01); *F16H 2061/243* (2013.01); *G05G 2009/04703* (2013.01)

(58) Field of Classification Search
CPC ........ F16H 61/243; F16H 59/00; F16H 59/02; F16H 59/08; F16H 59/10; F16H 59/105; F16H 59/0278; G05G 2009/04703; G05G 9/047; B60K 20/04
See application file for complete search history.

(56) References Cited

U.S. PATENT DOCUMENTS

| | | | | |
|---|---|---|---|---|
| 8,532,894 B2* | 9/2013 | Kim | ............... | F16H 59/0204 |
| | | | | 180/332 |
| 8,560,194 B2* | 10/2013 | Kim | ............... | F16H 59/105 |
| | | | | 180/332 |
| 9,303,756 B2* | 4/2016 | Yamamoto | ........... | F16H 59/105 |
| 2003/0213327 A1* | 11/2003 | Syamoto | ............ | F16H 59/0204 |
| | | | | 74/473.12 |
| 2004/0182191 A1* | 9/2004 | Kondo | ............... | F16H 59/0278 |
| | | | | 74/473.3 |
| 2008/0041180 A1 | 2/2008 | Cho | | |
| 2010/0242656 A1* | 9/2010 | Kino | ..................... | F16H 59/10 |
| | | | | 74/473.12 |
| 2016/0377174 A1* | 12/2016 | Voelz | ................... | F16H 59/105 |
| | | | | 74/491 |

FOREIGN PATENT DOCUMENTS

| | | | | |
|---|---|---|---|---|
| JP | H06-280973 | A | 10/1994 | |
| JP | 2010-221972 | A | 10/2010 | |
| JP | 2010-234950 | | 10/2010 | |
| JP | 2010221972 | A * | 10/2010 | ......... F16H 59/0204 |

OTHER PUBLICATIONS

European Search Report (EESR) Issued in the European Patent Application Corresponding to This Application dated Jun. 24, 2016.
Office Action issued in the corresponding Japanese Application No. 2015-024746 dated Feb. 21, 2017.
European Patent Application No. 16154662.7-1755 Office Action, dated Aug. 16, 2017.
Chinese Patent Application No. 201610059208.X Office Action, dated Jun. 1, 2017, and English translation thereof.

* cited by examiner

SHIFT DEVICE

CROSS-REFERENCE TO RELATED APPLICATION

This application is based on and claims priority under 35 USC 119 from Japanese Patent Application No. 2015-24746 filed on Feb. 10, 2015, the disclosure of which is incorporated by reference herein.

BACKGROUND

Technical Field

The present invention relates to a shift device in which a shift body is moved to change a shift position of the shift body.

Related Art

In a shift lever device described in Japanese Patent Application Laid-Open (JP-A) No. 2010-234950, a sensor switch is provided at housing and a magnet is provided at a shift lever, detection sensors of the sensor switch detect the magnet, and a shift position of the shift lever is thereby detected.

Note that, in this shift lever device, if the accuracy of relative assembly positions of the detection sensors and the magnet could be increased, the detection accuracy of the shift position of the shift lever could be improved.

SUMMARY

In consideration of the above circumstances, an object of the present invention is to obtain a shift device capable of improving the detection accuracy of a shift position of a shift body.

Solution to Problem

A shift device of a first aspect of the present invention includes: a supporting body that is provided at a vehicle body side; a shift body that is supported by the supporting body and that is moved to change a shift position; a detection section that is provided at one of the supporting body or the shift body; a detection means that is provided at the other of the supporting body or the shift body and that detects the detection section so as to detect a shift position of the shift body; a facing portion that is provided at one of a side of the detection section or a side of the detection means; and a facing hole that is provided so as to penetrate the other of the side of the detection section or the side of the detection means and that faces the facing portion when the shift body has been moved to a specific position.

In the shift device of the first aspect of the present invention, the supporting body is provided at the vehicle body side, the shift body is supported by the supporting body, and the shift body is moved to change a shift position of the shift body. The detection section is provided at one of the supporting body or the shift body, the detection means is provided at the other of the supporting body or the shift body, and the detection means detects the detection section to detect a shift position of the shift body.

Note that the facing portion is provided at one of the side of the detection section or the side of the detection means, and the facing hole is provided so as to penetrate the other of the side of the detection section or the side of the detection means. The facing portion and the facing hole face each other when the shift body has been moved to the specific position. Thus, when the detection section and the detection means are being assembled, in a state in which the shift body is disposed in the specific position, causing the facing portion and the facing hole to face each other enables the accuracy of the relative assembly positions of the detection section and the detection means to be increased, and enables the detection accuracy of the shift position of the shift body to be improved.

A shift device of a second aspect of the present invention is the shift device of the first aspect of the present invention, further including a biasing means that causes the shift body to move to the specific position by biasing force when there is no operating force acting on the shift body.

In the shift device of the second aspect of the present invention, the biasing means causes the shift body to move to the specific position by biasing force when there is no operating force acting on the shift body. Thus, when the detection section and the detection means are being assembled, when the facing portion and the facing hole are made to face each other, the biasing means can dispose the shift body in the specific position by biasing force, enabling the accuracy of the relative assembly positions of the detection section and the detection means to be easily increased.

A shift device of a third aspect of the present invention is the shift device of the first aspect or the second aspect of the present invention, wherein the facing portion is a hole.

In the shift device of the third aspect of the present invention, the facing portion is the hole. Thus, when the detection section and the detection means are being assembled, in the state in which the shift body is disposed in the specific position, a through-shaft penetrating the facing hole and being inserted into the facing portion enables the facing portion and the facing hole to be easily made to face each other, and enables the accuracy of the relative assembly positions of the detection section and the detection means to be easily increased.

A shift device of a fourth aspect of the present invention is the shift device of the third aspect of the present invention, wherein the facing portion and the facing hole have a same minimum diameter.

In the shift device of the fourth aspect of the present invention, the facing portion and the facing hole have the same minimum diameter. Thus, when the detection section and the detection means are being assembled, in the state in which the shift body is disposed in the specific position, a through-shaft penetrating and being fitted to the facing hole and the through-shaft being fitted into the facing portion enables the facing portion and the facing hole to be made to face each other with a high accuracy, and enables the accuracy of the relative assembly positions of the detection section and the detection means to be effectively increased.

A shift device of a fifth aspect of the present invention is the shift device of any one of the first aspect to the fourth aspect of the present invention, wherein plural of the facing portions and plural of the facing holes are respectively provided.

In the shift device of the fifth aspect of the present invention, the plural facing portions and the plural facing holes are respectively provided. Thus, when the detection section and the detection means are being assembled, in the state in which the shift body is disposed in the specific position, causing the plural facing portions and the plural facing holes to respectively face each other enables the accuracy of the relative assembly positions of the detection section and the detection means to be effectively increased.

BRIEF DESCRIPTION OF THE DRAWINGS

Exemplary embodiments of the present invention will be described in detail based on the following figures, wherein.

DETAILED DESCRIPTION

Figure 1:
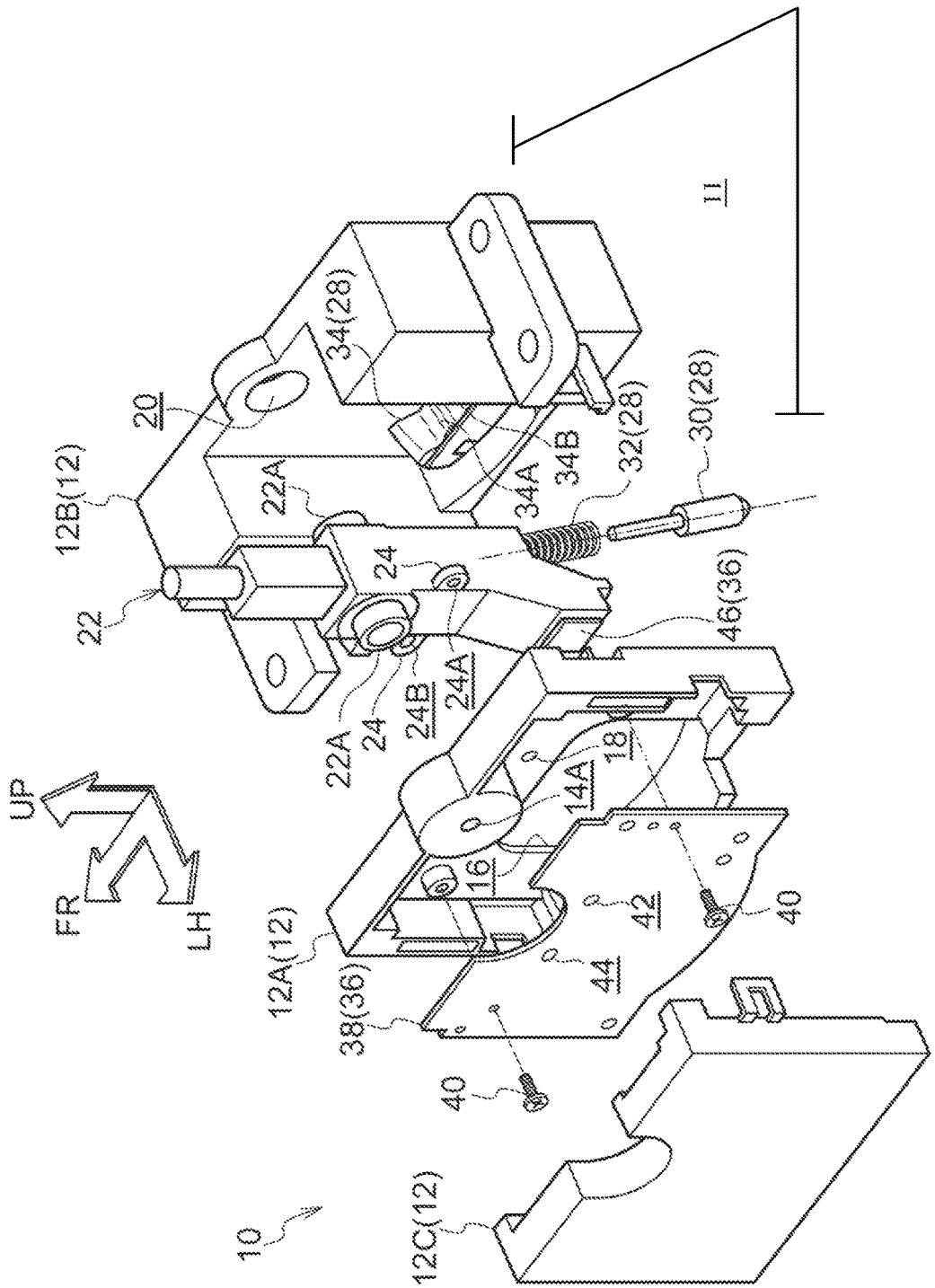
FIG. 1 is an exploded perspective view illustrating a shift lever device according to an exemplary embodiment of the present invention, viewed diagonally from the rear left.
Figure 2:
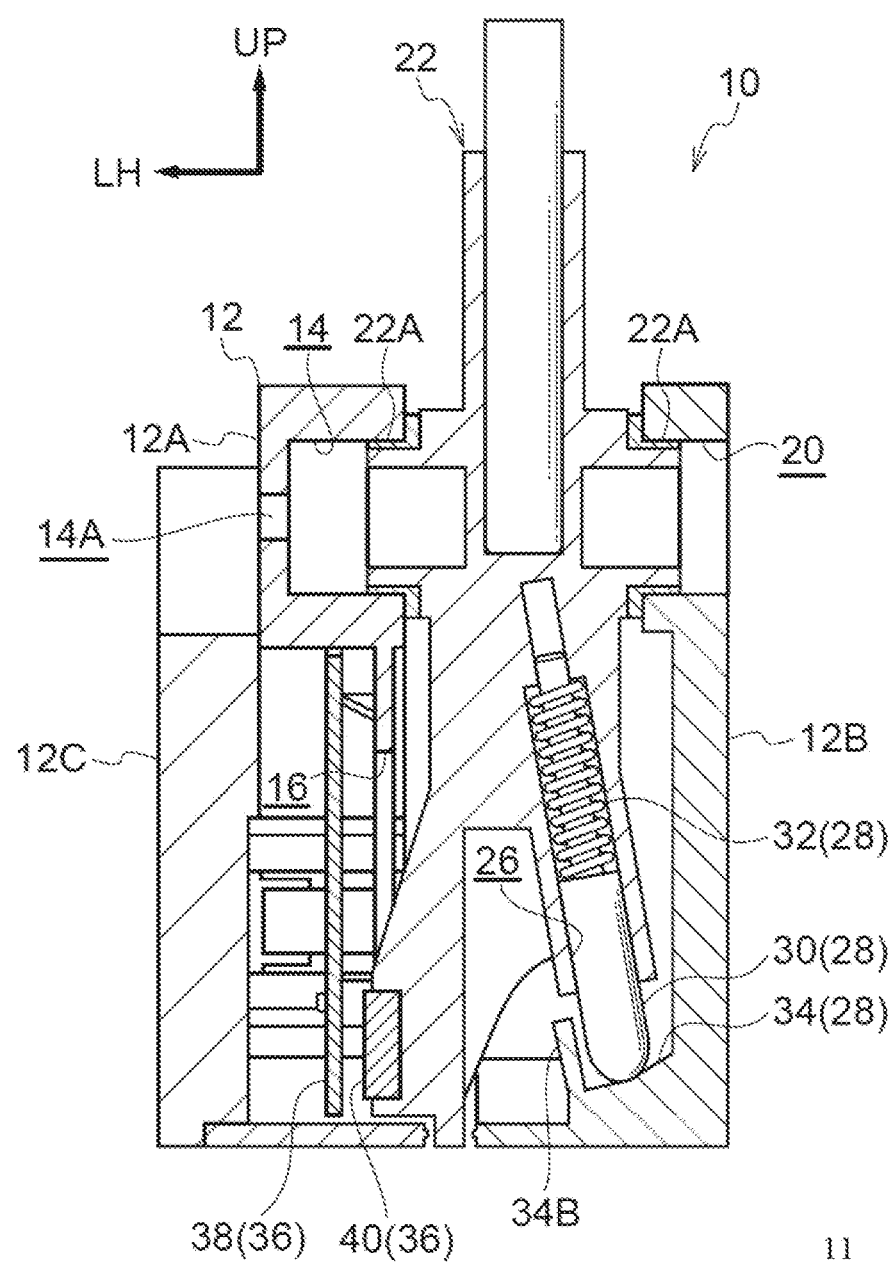
FIG. 2 is a cross-section illustrating the shift lever device according to the exemplary embodiment of the present invention, viewed from the rear.
Figure 8:
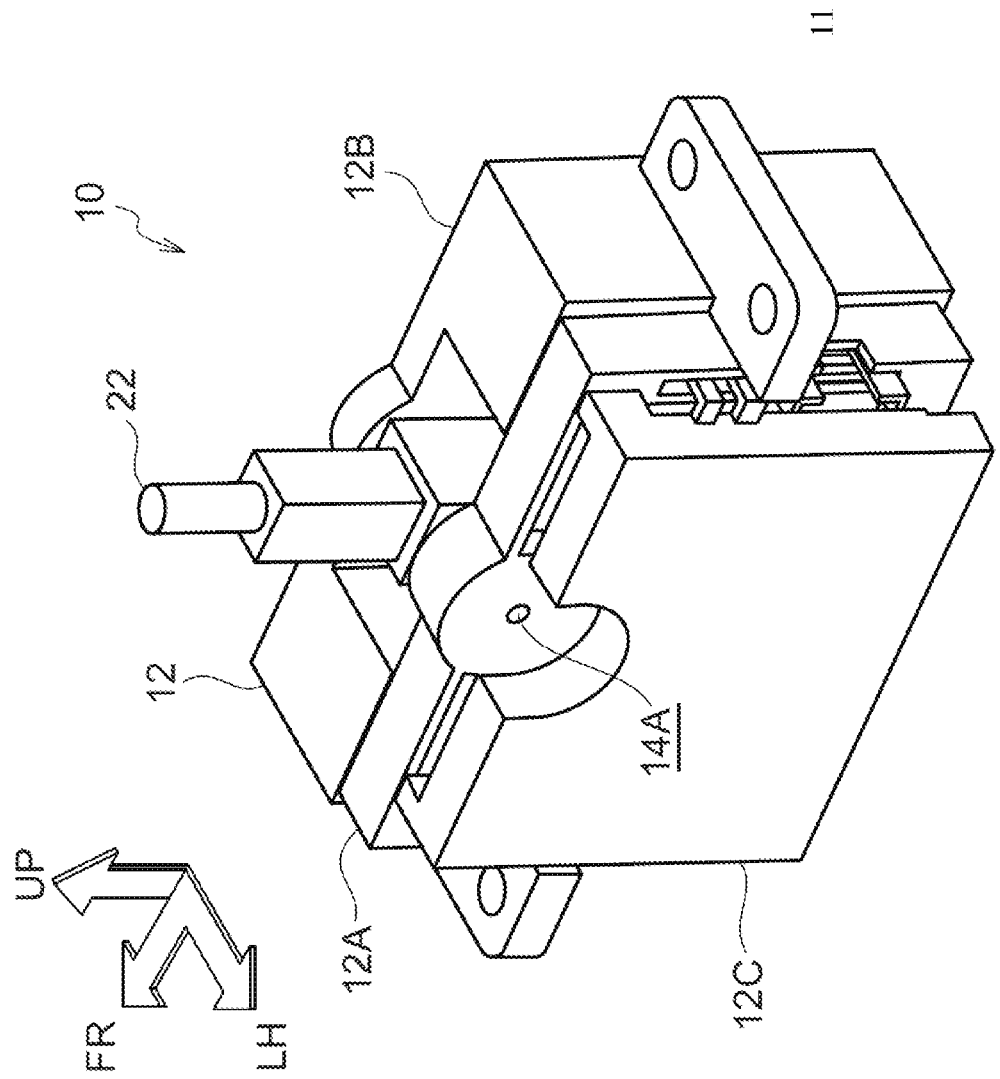
FIG. 8 is a perspective view illustrating the shift lever device according to the exemplary embodiment of the present invention, viewed diagonally from the rear left.

FIG. 1 is an exploded perspective view illustrating a shift lever device 10, serving as a shift device according to an exemplary embodiment of the present invention, viewed diagonally from the rear left, and FIG. 2 is a cross-section illustrating the shift lever device 10 viewed from the rear. FIG. 8 is a perspective view illustrating the shift lever device 10 viewed diagonally from the rear left. Note that in the drawings, the arrow FR indicates the front of the shift lever device 10, the arrow LH indicates the left of the shift lever device 10, and the arrow UP indicates the upper side of the shift lever device 10.

The shift lever device 10 according to the present exemplary embodiment is what is referred to as a straight type and a shift-by-wire type shift device. The shift lever device 10 is a floor-mounted type device installed at a floor section 11 (vehicle body side) of a vehicle cabin at the vehicle width direction inside of a driver seat (not illustrated in the drawings) of a vehicle (automobile). The front, left, and upper side of the shift lever device 10 respectively face the front, left, and upper side of the vehicle.

As illustrated in FIG. 1, FIG. 2, and FIG. 8, substantially rectangular box shaped housing 12, serving as a supporting body made of resin, is provided at the shift lever device 10, and the housing 12 is fixed to the floor section 11 of the vehicle cabin.

A bottomed, substantially rectangular tube shaped first plate 12A, serving as a first dividing member, is provided at the housing 12, and the inside of the first plate 12A is open toward the left side. A circular first support hole 14 is formed in an upper end portion of the first plate 12A, and the first support hole 14 is open toward the right side. A rectangular shaped through-hole 16 is formed so as to penetrate a lower side portion of a right wall of the first plate 12A.

A circular placement hole 14A is formed so as to penetrate a bottom wall (left wall) of the first support hole 14 at the upper end portion of the first plate 12A, and the placement hole 14A is disposed coaxially to the first support hole 14. A circular first insertion hole 18, serving as an insertion hole, is formed so as to penetrate a rear side portion at the upper side of the through-hole 16 in the right wall of the first plate 12A. A substantially elliptical shaped second insertion hole (not illustrated in the drawings), serving as an insertion hole, is formed so as to penetrate a front side portion at the upper side of the through-hole 16 in the right wall of the first plate 12A. The second insertion hole is elongated in the front-rear direction, and an upper end face and a lower end face thereof configure planar faces that are perpendicular to the up-down direction.

A substantially rectangular box shaped second plate 12B, serving as a second dividing member, is provided at the housing 12 at the right side of the first plate 12A, and the inside of the second plate 12B is open toward the left side and the upper side. The second plate 12B is assembled to the first plate 12A, and the left side inside the second plate 12B is closed off by the first plate 12A. A circular second support hole 20 is formed so as to penetrate an upper end portion of a right wall of the second plate 12B. The second support hole 20 is disposed coaxially to the first support hole 14 of the first plate 12A.

A substantially rectangular plate shaped cover 12C, serving as a third dividing member, is provided at the housing 12 at the left side of the first plate 12A. The cover 12C is assembled to the first plate 12A, and closes off the left side inside the first plate 12A.

An elongated rod shaped lever 22, serving as a shift body made of resin, is provided at the shift lever device 10. A pair of circular tube shaped support shafts 22A are integrally provided at an up-down direction intermediate portion of the lever 22, and the support shafts 22A project out coaxially at the left side and the right side of the lever 22. The left side and right side support shafts 22A are respectively fitted into the first support hole 14 of the first plate 12A and the second support hole 20 of the second plate 12B. The lever 22 is supported at the pair of support shafts 22A by the first plate 12A (first support hole 14) and the second plate 12B (second support hole 18), and is capable of pivoting (moving) in the front-rear direction (a specific direction) with the pair of support shafts 22A as the center axis (with the left-right direction as the center axis line).

An upper side portion of the lever 22 extends out toward the upper side of the housing 12, and an upper end portion of the lever 22 is capable of being pivot-operated in the front-rear direction by an occupant of the vehicle (particularly the driver). The lever 22 is accordingly capable of being pivot-operated to an "R" position (reverse position), an "N" position (neutral position), an "H" position (home position), an "N" position (neutral position), and a "D"

position (drive position), serving as shift positions on progression from the front side toward the rear side.

Figure 9:
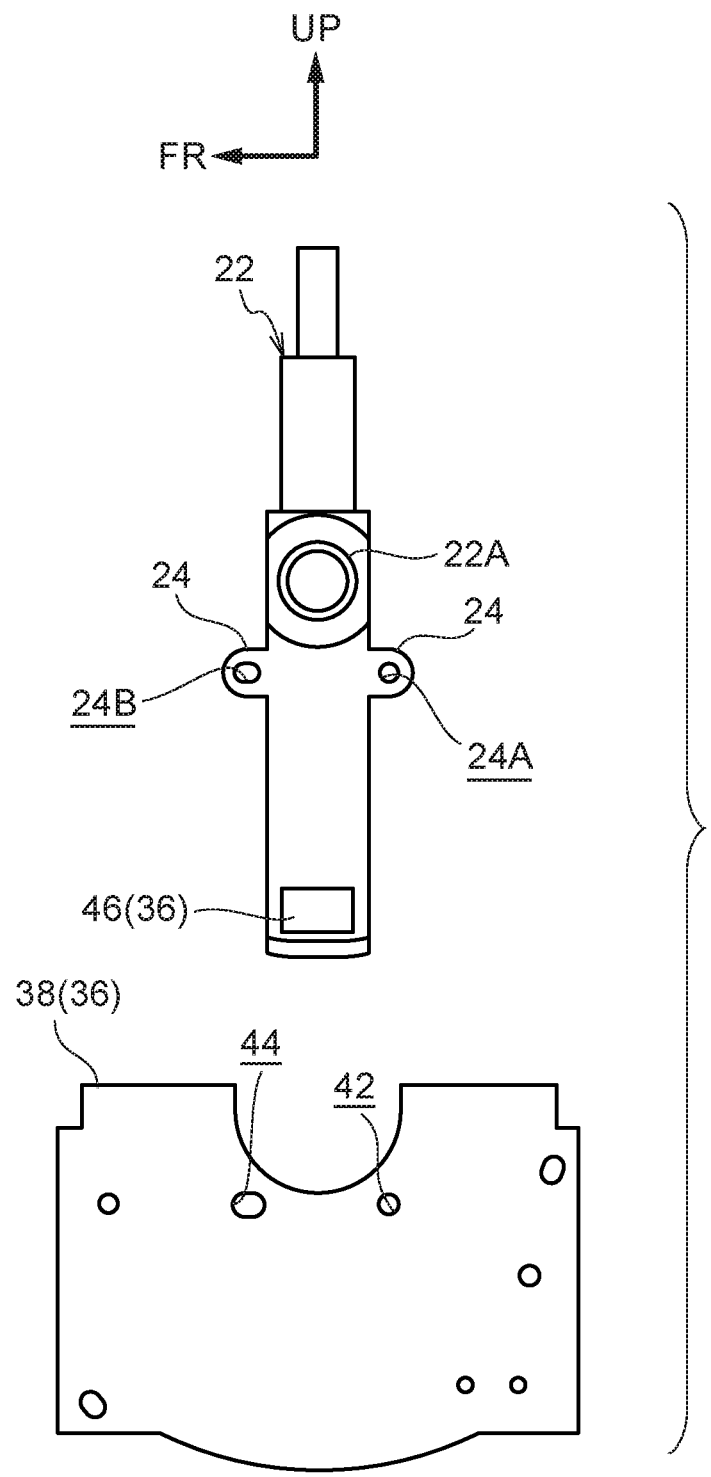
FIG. 9 is a side view illustrating a lever and a printed wiring board of the shift lever device according to the exemplary embodiment of the present invention, viewed from the left.

A pair of substantially semi-elliptical, plate shaped facing protrusions 24 are integrally provided at the lever 22 at the lower side of the support shafts 22A, and the facing protrusions 24 project out toward the rear side and the front side. A circular first facing cavity 24A (see FIG. 9 and FIG. 10), serving as a facing portion, is formed so as to penetrate the rear side facing protrusion 24, and a substantially elliptical shaped second facing cavity 24B (see FIG. 9 and FIG. 10), serving as a facing portion, is formed so as to penetrate the front side facing protrusion 24. The first facing cavity 24A has the same shape as the first insertion hole 18 of the first plate 12A, and is the size of the first insertion hole 18, or less. When the lever 22 is disposed in the "H" position, serving as a specific position, the first facing cavity 24A faces the first insertion hole 18 coaxially in the left-right direction. The second facing cavity 24B has the same shape as the second insertion hole of the first plate 12A, and is the size of the second insertion hole, or less. When the lever 22 is disposed in the "H" position, the second facing cavity 24B faces the second insertion hole coaxially in the left-right direction in a state elongated along the front-rear direction.

A lower end portion of the lever 22 projects out toward the left side, and penetrates the through-hole 16 of the first plate 12A. A circular insertion hole 26 is formed in a right side and lower side portion of the lever 22. The insertion hole 26 extends in a downward direction on progression toward the right, and is open toward the lower side.

An indexing mechanism 28, serving as a biasing means, is provided at the shift lever device 10.

A substantially circular column shaped detent pin 30, serving as a moving member, is provided at the indexing mechanism 28, and the detent pin 30 is inserted (fitted) coaxially into the insertion hole 26 of the lever 22. The detent pin 30 is incapable of moving in the radial direction, but is capable of moving in the axial direction with respect to the lever 22 (insertion hole 26). A lower side portion of the detent pin 30 projects out from the insertion hole 26 toward the lower side, and a lower side face of the detent pin 30 projects out in a semispherical shape.

A compression coil spring 32, serving as a biasing member, spans across between the detent pin 30 and a bottom face (upper side face) of the insertion hole 26, and the compression coil spring 32 biases the detent pin 30 toward the lower side.

A block shaped detent slope 34, serving as an indexing member, is provided at the indexing mechanism 28, and the detent slope 34 is fixed to a right side and lower side corner portion inside the second plate 12B. The detent slope 34 is elongated along the front-rear direction, and a lower side face of the detent pin 30 abuts an upper side face of the detent slope 34 due to the biasing force of the compression coil spring 32.

The upper side face of the detent slope 34 is substantially sloped in a downward direction on progression toward the length direction (front-rear direction) center thereof. When there is no operating force acting on the lever 22, the detent pin 30 is disposed at the length direction center of the upper side face of the detent slope 34, and the lever 22 is disposed in the "H" position, due to the biasing force of the compression coil spring 32.

Plural protruding portions 34A, each with a substantially triangular shaped cross-section, are formed to the upper side face of the detent slope 34 at spacings along the length direction thereof. When the lever 22 is pivot-operated in the front-rear direction, the detent pin 30 rides over the protruding portion 34A between shift positions in a state of being biased by the compression coil spring 32, thereby imparting an indexing sensation to the pivot-operation of the lever 22.

An inverted, substantially triangular plate shaped anchor plate 34B, serving as an anchor portion, is integrally provided at a left end of the upper side face of the detent slope 34. The anchor plate 34B projects out from the upper side face of the detent slope 34 toward the upper side.

A detection mechanism 36 is provided at the shift lever device 10.

A substantially rectangular plate shaped printed wiring board 38, serving as an installed member, is provided at the detection mechanism 36. The printed wiring board 38 is fixed inside the first plate 12A using plural screws 40, and is disposed perpendicularly to the left-right direction. Plural detection elements (not illustrated in the drawings), serving as detection means, are provided at a right face of a lower side portion of the printed wiring board 38. The plural detection elements are disposed at spacings along the pivot-circumferential direction of the lever 22, and each has a highly accurate installed position on the printed wiring board 38. The left side of the printed wiring board 38 is covered by the cover 12C.

A circular first facing hole 42, serving as a facing hole, is formed so as to penetrate an upper side and rear side portion of the printed wiring board 38. The first facing hole 42 has the same shape as the first insertion hole 18 of the first plate 12A, is the size of the first insertion hole 18, or less, and faces the first insertion hole 18 coaxially in the left-right direction. The first facing hole 42 has the same shape and size as the first facing cavity 24A of the lever 22, and when the lever 22 is disposed in the "H" position, the first facing hole 42 faces the first facing cavity 24A coaxially in the left-right direction, across the first insertion hole 18.

A substantially elliptical shaped second facing hole 44, serving as a facing hole, is formed so as to penetrate an upper side and front side portion of the printed wiring board 38. The second facing hole 44 has the same shape as the second insertion hole of the first plate 12A, is the size of the second insertion hole, or less, is elongated along the front-rear direction, and faces the second insertion hole coaxially in the left-right direction. The second facing hole 44 has the same shape and size as the second facing cavity 24B of the lever 22, and when the lever 22 is disposed in the "H" position, the second facing hole 44 faces the second facing cavity 24B, disposed elongated along the front-rear direction, coaxially in the left-right direction with the second insertion hole interposed therebetween.

A substantially rectangular shaped magnet 46, serving as a detection section, is fixed by insert molding to a lower end portion of a left side portion of the lever 22. The magnet 46 has a highly accurate fixing position on the lever 22. The magnet 46 is exposed at the left side inside the first plate 12A, with a left face disposed perpendicularly to the left-right direction. The magnet 46 faces the printed wiring board 38 in the left-right direction. When the lever 22 is disposed in the respective shift positions, the magnet 46 faces the corresponding detection element of the printed wiring board 38 in the left-right direction, such that this detection element detects a magnetic force generated by the magnet 46 to detect the shift position of the lever 22.

Explanation follows regarding operation of the present exemplary embodiment.

In the shift lever device 10 with the above configuration, the lever 22 is pivoted in the front-rear direction to change the shift position of the lever 22. In the detection mechanism 36, when the lever 22 is disposed in the respective shift positions, the magnet 46 of the lever 22 faces the corresponding detection element of the printed wiring board 38 in the left-right direction, such that this detection element detects the magnetic force generated by the magnet 46 to detect the shift position of the lever 22. In the indexing mechanism 28, when there is no operating force acting on the lever 22, the detent pin 30 is disposed at the length direction center of the upper side face of the detent slope 34, and the lever 22 is disposed in the "H" position, due to the biasing force of the compression coil spring 32.

Figure 3:
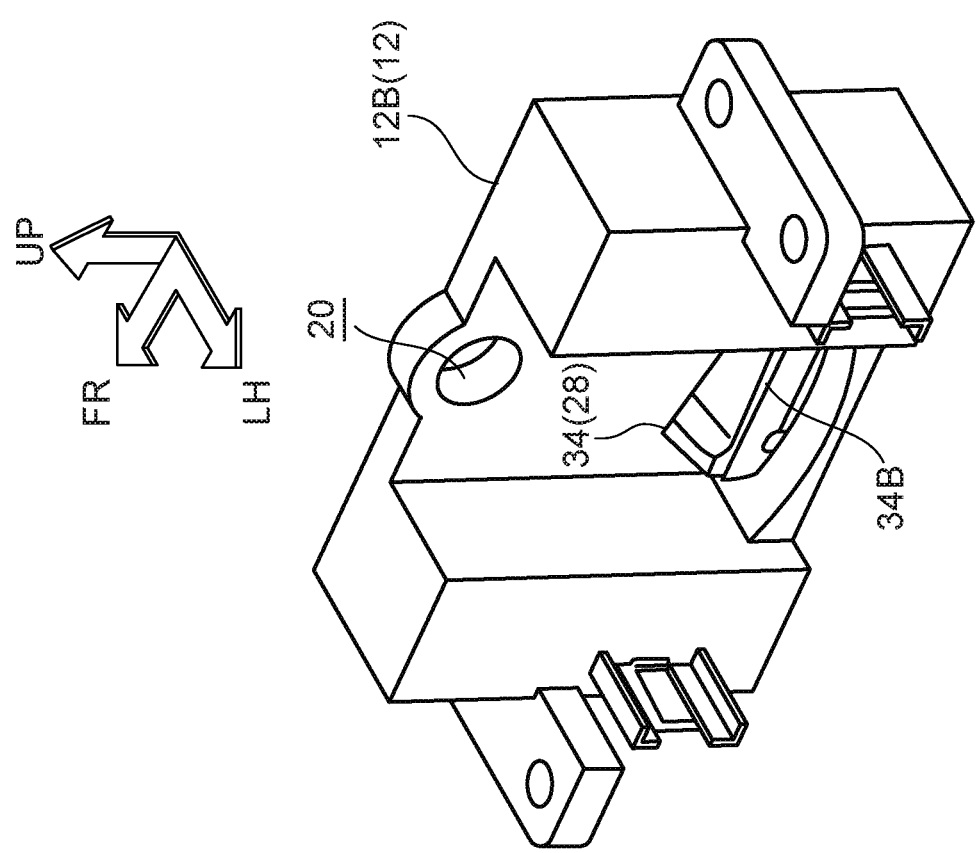
FIG. 3 is a perspective view illustrating a first assembly stage of the shift lever device according to the exemplary embodiment of the present invention, viewed diagonally from the rear left.

When the shift lever device 10 is being assembled, first, as illustrated in FIG. 3, the detent slope 34 is fixed inside the second plate 12B of the housing 12 from the left side thereof.

Figure 4:
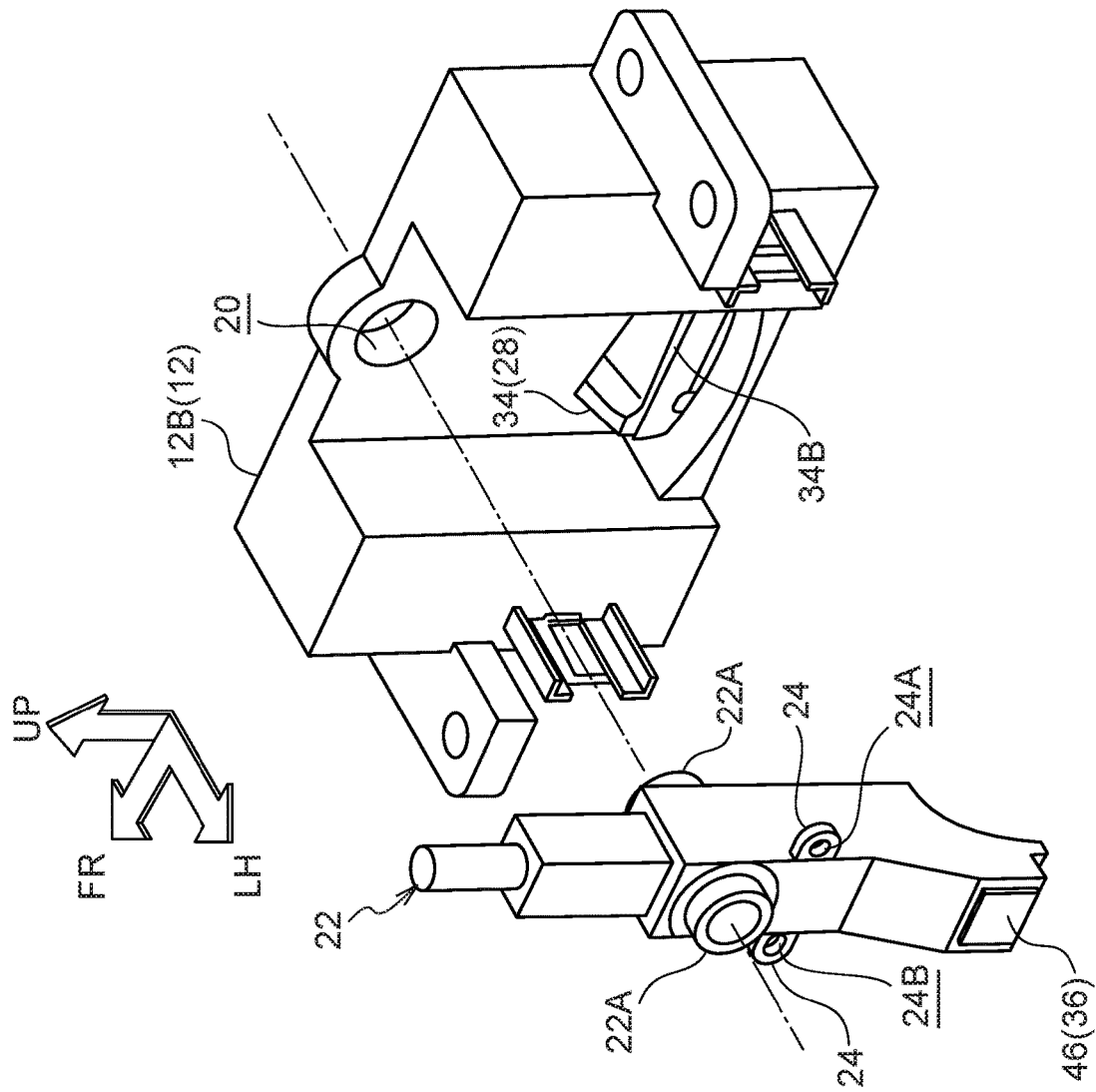
FIG. 4 is a perspective view illustrating a second assembly stage of the shift lever device according to the exemplary embodiment of the present invention, viewed diagonally from the rear left.

Next, as illustrated in FIG. 4, the right side support shaft 22A of the lever 22 is fitted into the second support hole 20 of the second plate 12B from the left side thereof. When this is performed, the compression coil spring 32 and the detent pin 30 are inserted into the insertion hole 26 of the lever 22, and the detent pin 30 is moved toward the upper side against the biasing force of the compression coil spring 32 to ride over the anchor plate 34B of the detent slope 34 from the left side thereof. The lower side face of the detent pin 30 thereby abuts the upper side face of the detent slope 34 due to the biasing force of the compression coil spring 32. In this state, the anchor plate 34B is capable of anchoring the detent pin 30 against movement toward the left side (see FIG. 2), such that the lever 22 (the right side support shaft 22A) is suppressed from detaching from the second plate 12B (second support hole 20) due to the biasing force of the compression coil spring 32. The detent pin 30 is also disposed at the length direction center of the upper side face of the detent slope 34 and the lever 22 is disposed in the "H" position, due to the biasing force of the compression coil spring 32.

Figure 5:
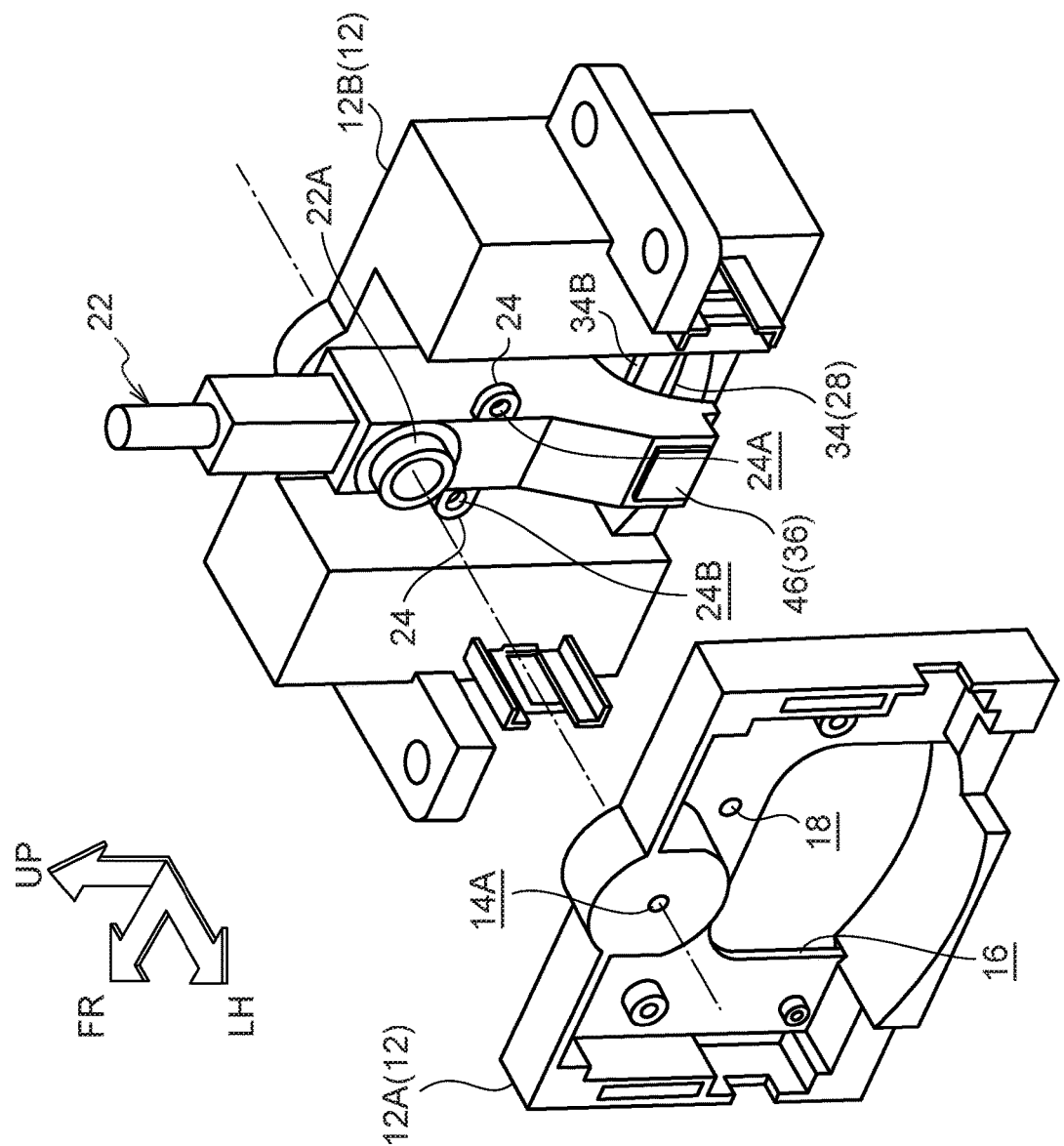
FIG. 5 is a perspective view illustrating a third assembly stage of the shift lever device according to the exemplary embodiment of the present invention, viewed diagonally from the rear left.

Then, as illustrated in FIG. 5, the first plate 12A of the housing 12 is assembled to the second plate 12B from the left side thereof, and the left side support shaft 22A of the lever 22 is fitted into the first support hole 14 of the first plate 12A (see FIG. 2).

Figure 6:
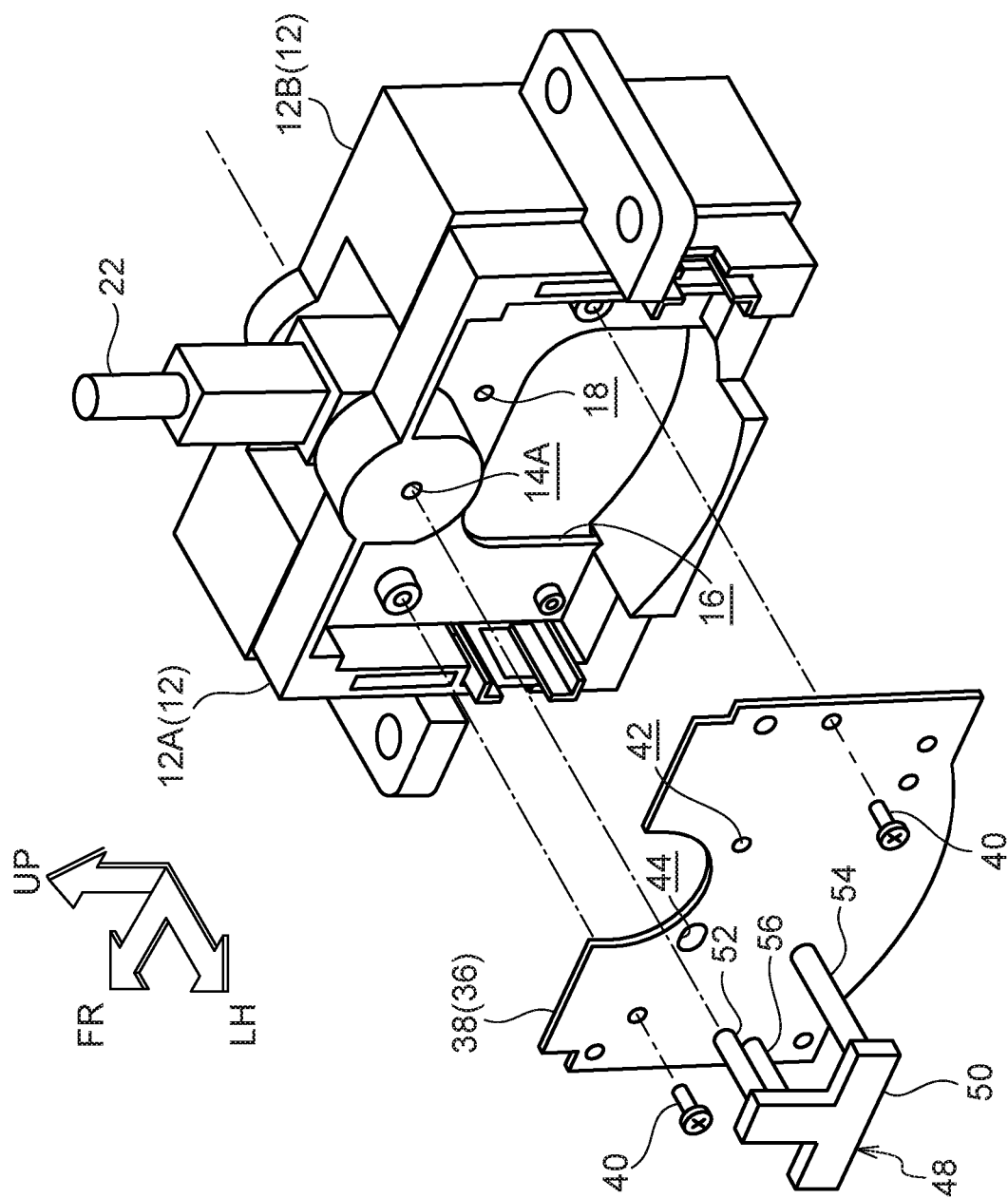
FIG. 6 is a perspective view illustrating a fourth assembly stage of the shift lever device according to the exemplary embodiment of the present invention, viewed diagonally from the rear left.

Next, as illustrated in FIG. 6, the printed wiring board 38 is fixed inside the first plate 12A from the left side thereof using the plural screws 40.

Figure 7:
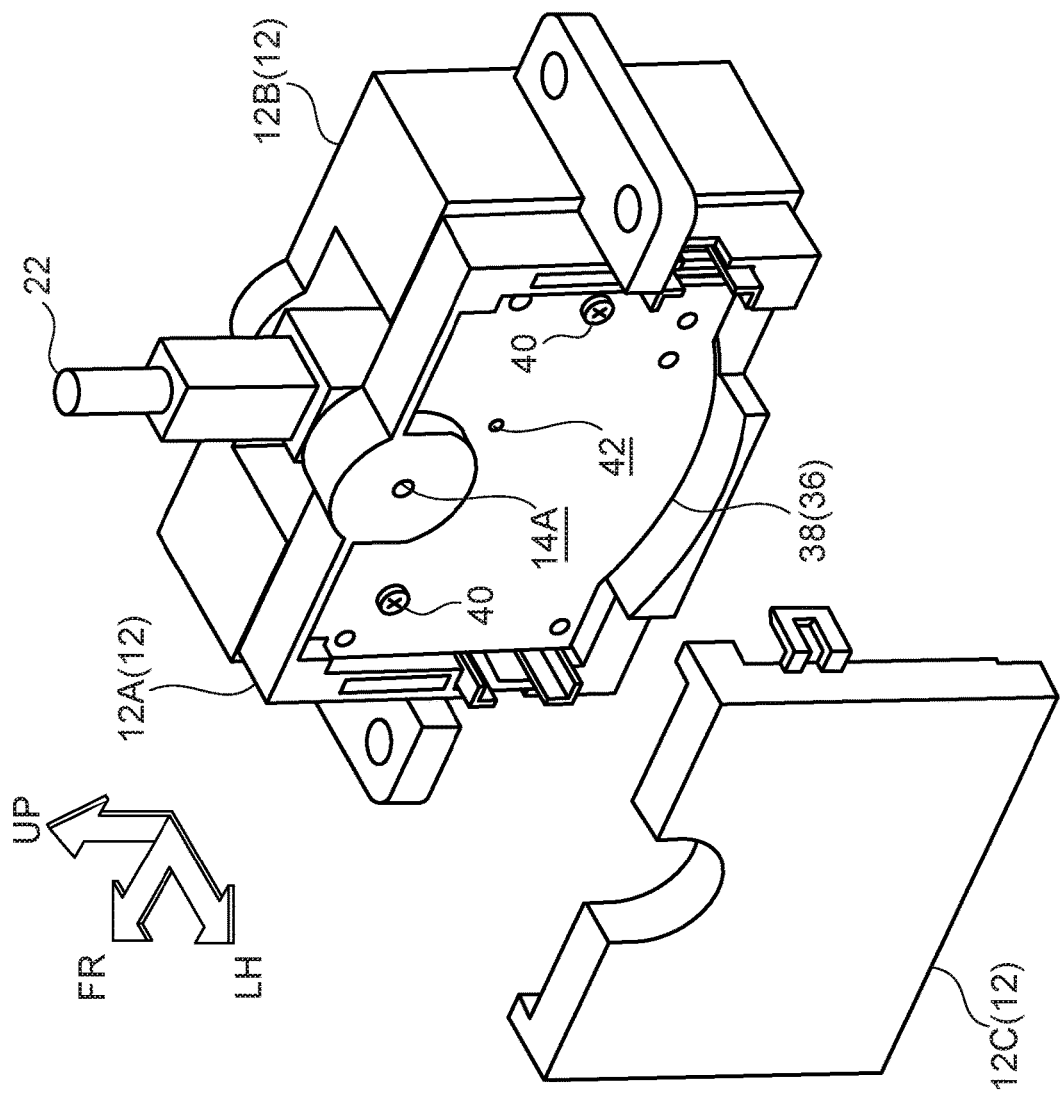
FIG. 7 is a perspective view illustrating a fifth assembly stage of the shift lever device according to the exemplary embodiment of the present invention, viewed diagonally from the rear left.

Lastly, as illustrated in FIG. 7, the cover 12C of the housing 12 is assembled to the first plate 12A from the left side thereof.

Figure 10:
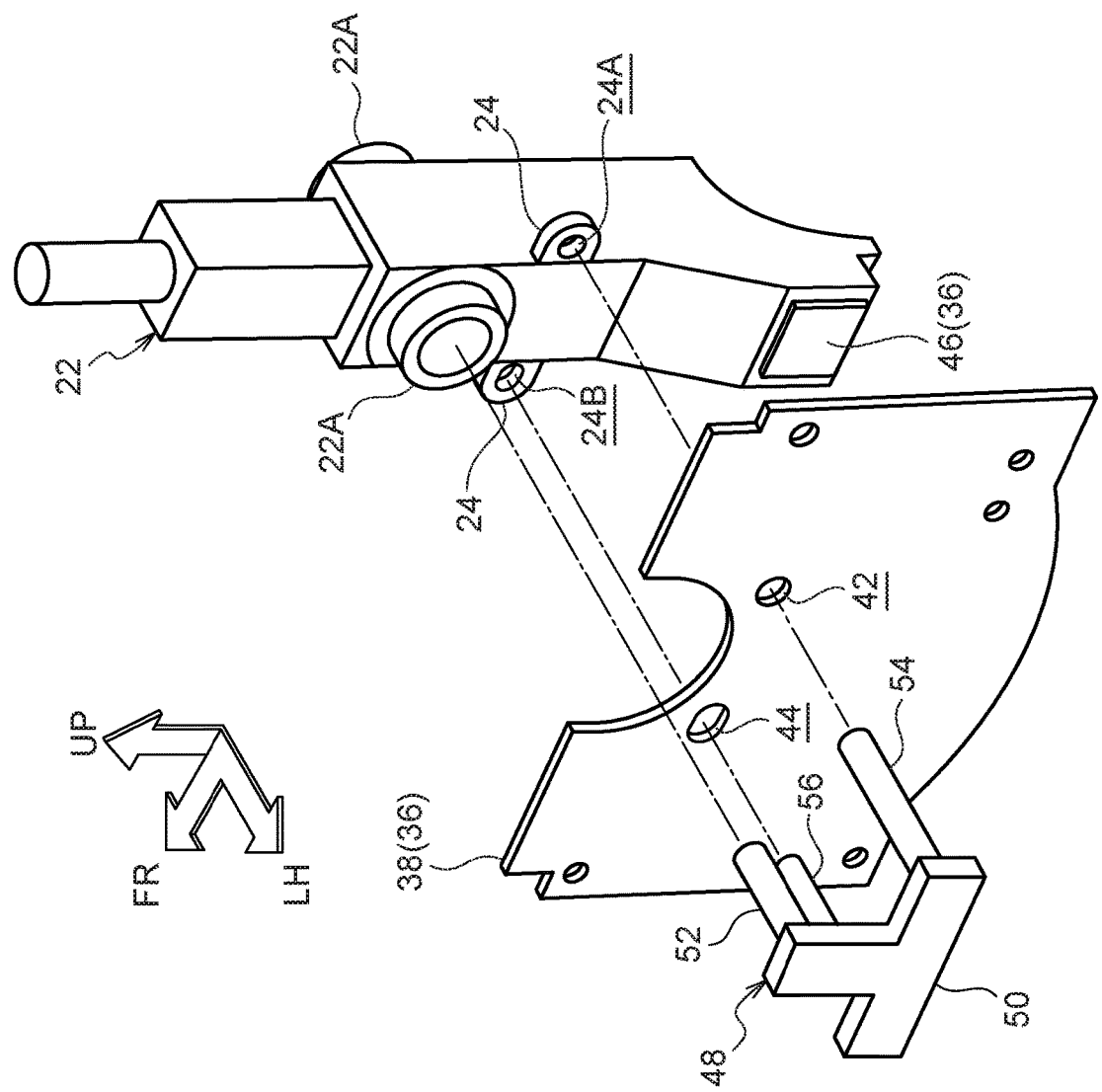
FIG. 10 is an exploded perspective view illustrating the lever, the printed wiring board, and an adjustment jig of the shift lever device according to the exemplary embodiment of the present invention, viewed diagonally from the rear left.

Note that, as illustrated in FIG. 6 and FIG. 10, an adjustment jig 48 is employed when the shift lever device 10 is being assembled. The adjustment jig 48 is provided with an inverted T plate shaped fixing plate 50. A placement shaft 52, a first through-shaft 54 (through-shaft), and a second through-shaft 56 (through-shaft), that each have a circular column shape, are respectively fixed to an upper portion, a rear portion, and a front portion of the fixing plate 50. The placement shaft 52, the first through-shaft 54, and the second through-shaft 56 project out perpendicularly from the fixing plate 50 toward the right, and the axial directions of the placement shaft 52, the first through-shaft 54, and the second through-shaft 56 are disposed so as to be parallel to each other.

Note that the placement hole 14A, the first insertion hole 18, and the second insertion hole are formed so as to penetrate the first plate 12A, the first facing cavity 24A and the second facing cavity 24B are formed to the lever 22 (at the side of the magnet 46), and the first facing hole 42 and the second facing hole 44 are formed so as to penetrate the printed wiring board 38 (at the side of the detection element). When the lever 22 is disposed in the "H" position, the first facing cavity 24A and the first facing hole 42 face each other coaxially in the left-right direction with the first insertion hole 18 interposed therebetween, and the second facing cavity 24B and the second facing hole 44, which are disposed elongated along the front-rear direction, face each other coaxially in the left-right direction with the second insertion hole interposed therebetween.

Thus, when the shift lever device 10 is being assembled, as illustrated in FIG. 6, in a state in which the lever 22 is disposed in the "H" position prior to fixing the printed wiring board 38 inside the first plate 12A, the placement shaft 52 is fitted into the placement hole 14A, the first through-shaft 54 is fitted into the first facing cavity 24A and the first facing hole 42 with the first insertion hole 18 interposed therebetween, and the second through-shaft 56 is fitted together with the second facing cavity 24B and the second facing hole 44 in the up-down direction with the second insertion hole interposed therebetween, in the adjustment jig 48 from the left side. Due to the first facing cavity 24A and the first facing hole 42 facing each other coaxially in the left-right direction, and the second facing cavity 24B and the second facing hole 44 facing each other coaxially in the left-right direction, the lever 22 (magnet 46) and the printed wiring board 38 (the respective detection elements) are positioned in the pivot-circumferential direction and the pivot-radial direction of the lever 22. Fixing the printed wiring board 38 inside the first plate 12A in this state accordingly enables the accuracy of the relative assembly positions of the magnet 46 and the respective detection elements in the pivot-circumferential direction and the pivot-radial direction of the lever 22 to be increased. This enables the magnet 46 to suitably face the corresponding detection element in the left-right direction, enables the magnetic force of the magnet 46 to be suitably detected by this detection element, enables the detection accuracy of the shift position of the lever 22 to be improved, and enables the pivot angle (pivot stroke) between shift positions of the lever 22 to be reduced, when the lever 22 is disposed in the respective shift position.

As described above, when the shift lever device 10 is being assembled, the lever 22 is disposed in the "H" position due to the biasing force of the compression coil spring 32. This enables the lever 22 to be easily disposed in the "H" position due to the biasing force of the compression coil spring 32, and the accuracy of the relative assembly positions of the magnet 46 and each detection element to be easily increased, when the lever 22 (magnet 46) and the printed wiring board 38 (each detection element) are being positioned by the adjustment jig 48.

As described above, two facing cavities (the first facing cavity 24A and the second facing cavity 24B) are provided in the lever 22, and two facing holes (the first facing hole 42 and the second facing hole 44) are provided in the printed wiring board 38. Thus, in a state in which the lever 22 is disposed in the "H" position when the shift lever device 10 is being assembled, the first facing cavity 24A and the first facing hole 42 face each other, and the second facing cavity 24B and the second facing hole 44 face each other, thereby enabling the accuracy of the relative assembly positions of the magnet 46 and each detection element to be effectively increased.

As described above, the first facing cavity 24A and the second facing cavity 24B are formed in the lever 22. Thus, in a state in which the lever 22 is disposed in the "H" position when the shift lever device 10 is being assembled, the first through-shaft 54 and the second through-shaft 56 penetrate respectively the first facing hole 42 and the second facing hole 44 and are inserted into the first facing cavity 24A and the second facing cavity 24B, thereby enabling the first facing cavity 24A and the first facing hole 42 to be easily made to face each other, and enabling the second facing cavity 24B and the second facing hole 44 to be easily made to face each other. This enables the accuracy of the relative assembly positions of the magnet 46 and each detection element to be even more easily increased.

The first facing cavity 24A and the first facing hole 42 have the same shape and size, and the first facing cavity 24A and the first facing hole 42 have the same minimum diameter. Moreover, the second facing cavity 24B and the second facing hole 44 have the same shape and size, and the second facing cavity 24B and the second facing hole 44 have the same minimum diameter (width direction dimension). Thus, in a state in which the lever 22 is disposed in the "H" position when the shift lever device 10 is being assembled, the first through-shaft 54 and the second through-shaft 56 penetrate respectively, and are fitted together with, the first facing hole 42 and the second facing hole 44, and fitted together with the first facing cavity 24A and the second facing cavity 24B, thereby enabling the first facing cavity 24A and the first facing hole 42 to be made to face each other with high accuracy, and the second facing cavity 24B and the second facing hole 44 to be made to face each other with high accuracy. This enables the accuracy of the relative assembly positions of the magnet 46 and each detection element to be even more effectively increased.

Note that in the present exemplary embodiment, when assembling the shift lever device 10, the first facing cavity 24A and the first facing hole 42 are made to face each other, and the second facing cavity 24B and the second facing hole 44 are made to face each other, using the adjustment jig 48. However, when assembling the shift lever device 10, the first facing cavity 24A and the first facing hole 42 may be made to face each other and the second facing cavity 24B and the second facing hole 44 may be made to face each other visually.

In the present exemplary embodiment, the facing portions (the first facing cavity 24A and the second facing cavity 24B) are through-cavities. However, the facing portions may be recessed portions, protruding portions, or marks.

In the present exemplary embodiment, two facing portions (the first facing cavity 24A and the second facing cavity 24B) are provided, and two facing holes (the first facing hole 42 and the second facing hole 44) are provided. However, one, or three or more, facing portions may be provided, and one, or three or more, facing holes may be provided.

In the present exemplary embodiment, the facing portions (the first facing cavity 24A and the second facing cavity 24B) are provided at the lever 22. However, facing portions may be provided at the magnet 46.

In the present exemplary embodiment, the facing holes (the first facing hole 42 and the second facing hole 44) are provided at the printed wiring board 38. However, facing holes may be provided at the detection elements.

In the present exemplary embodiment, the facing portions (the first facing cavity 24A and the second facing cavity 24B) are provided at the lever 22 side, and the facing holes (the first facing hole 42 and the second facing hole 44) are provided at the printed wiring board 38 side. However, facing holes may be provided at the lever 22 side, and facing portions may be provided at the printed wiring board 38 side.

In the present exemplary embodiment, the printed wiring board 38 is disposed beside the pivot-circumferential direction (front-rear direction) of the lever 22. However, the printed wiring board 38 may be disposed at the inside (upper side) or the outside side (lower side) of the pivot-radial direction of the lever 22.

In the present exemplary embodiment, the printed wiring board 38 is provided at the housing 12, and the magnet 46 is provided at the lever 22. However, the magnet 46 may be provided at the housing 12, and the printed wiring board 38 may be provided at the lever 22.

In the present exemplary embodiment, the lever 22 is only capable of pivoting in the front-rear direction. However, the lever 22 may be configured capable of pivoting (moving) in plural directions that intersect (and in particular are orthogonal to) each other.

In the present exemplary embodiment, the shift lever device 10 is a shift-by-wire type shift device. However, the shift lever device 10 may be a shift device other than a shift-by-wire type (such as a mechanical cable type).

In the present exemplary embodiment, the shift lever device 10 is a floor-mounted type shift device, and is installed at the floor section 11 of the vehicle cabin. However, the shift lever device 10 may be installed to a steering column cover or an instrument panel in the vehicle cabin.

What is claimed is:

1. A shift device comprising:
a supporting body that is provided at a vehicle body side;
a shift body that is supported by the supporting body and that is moved to change a shift position;
a detection section that is provided at the shift body;
a printed wiring board that is provided at the supporting body and that detects the detection section so as to detect the shift position of the shift body;
a facing portion that is provided at the shift body;
a facing hole that is provided so as to penetrate the printed wiring board; and
an insertion hole that is provided through the supporting body,
wherein a pair of the facing portions and a pair of the facing holes are respectively provided, and one of the facing portions and one of the facing holes have central axes respectively,
wherein the one of the facing portions is movable relatively with respect to the one of the facing holes from a non-coaxial position with the one of the facing holes to a coaxial position with the one of the facing holes, and the one of the facing portions is disposed at the coaxial position with the one of the facing holes when the shift body has been moved to a specific position,
wherein another of the facing portions is movable relatively with respect to another of the facing holes from a non-facing position with the other of the facing holes to a facing position with the other of the facing holes, and the other of the facing portions is disposed at the facing position with the other of the facing holes when the shift body has been moved to the specific position,
wherein the insertion hole is disposed between the one of the facing portions and the one of the facing holes or between the other of the facing portions and the other of the facing holes when the shift body has been moved to the specific position,
wherein sizes of the one of the facing holes and the other of the facing holes are different, and
wherein the one of the facing portions and the one of the facing holes have a same minimum diameter.

2. The shift device of claim 1, further comprising a biasing means that causes the shift body to move to the specific position by biasing force when there is no operating force acting on the shift body.

3. The shift device of claim 1, wherein the one of the facing portions or the other of the facing portions is a hole.

4. The shift device of claim 1, wherein the one of the facing portions and the one of the facing holes are circular, and the other of the facing portions and the other of the facing holes have an elongated shape.

* * * * *